C. R. TOMPKINS.

Improvement in Sawing-Machines.

No. 129,193. Patented July 16, 1872.

Witnesses:
F. H. Clement
Thos. Smith

Inventor:
C. R. Tompkins 129,193

UNITED STATES PATENT OFFICE.

CHARLES R. TOMPKINS, OF ROCHESTER, NEW YORK.

IMPROVEMENT IN SAWING-MACHINES.

Specification forming part of Letters Patent No. 129,193, dated July 16, 1872.

Specification describing certain Improvements in Sawing-Machines, invented by C. R. TOMPKINS, of the city of Rochester, county of Monroe and State of New York.

This invention refers to that class of machines used for resawing lumber where it is important to use a very thin saw; and in order to do so it is necessary to strengthen the saw by means of flanges attached to the same and made so as to run in the lumber and to really form a part of the diameter of the saw; and as that part of the flanges that runs between the lumber that is being sawed is subjected to more or less friction on each side various devices have been applied at different times to prevent the heat that is generated by the friction from being communicated to the saw. This is the object of my invention, so to construct a saw and apply the flanges to strengthen the same, that a thin saw can be used; and if the flanges become heated by the friction against the same, that the heat so generated may not be transmitted to the saw sufficiently to affect the running of the same.

I am aware that large holes have been made in saws, and that they have been hung on the faces of pulleys or cones with arms in the same, and that several saws have been so operated on the same shaft, said arms being, as it is claimed, to prevent the saws from being heated by the friction or heating of the journals of shaft; but in those inventions the table is so placed that the lumber that is being cut runs entirely above the collars and would be of no advantage in resawing wide lumber, as a much larger saw would be required and the arms in said cones or collars would render it impossible to use them where a part of the same were used to make up the diameter of the saw in machines of this kind; consequently I make no claim to any of the foregoing devices.

Figure 1:
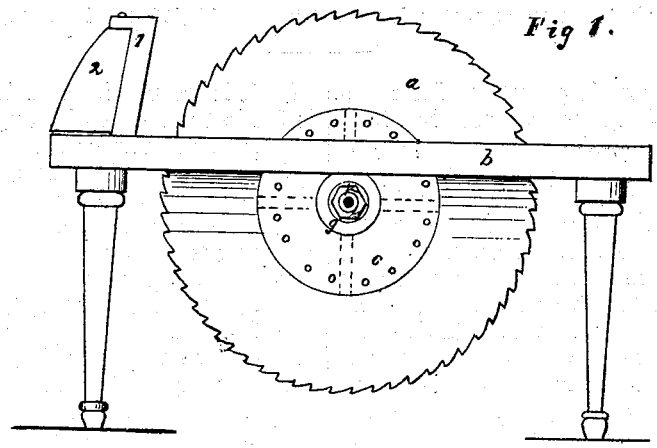
Figure 2:
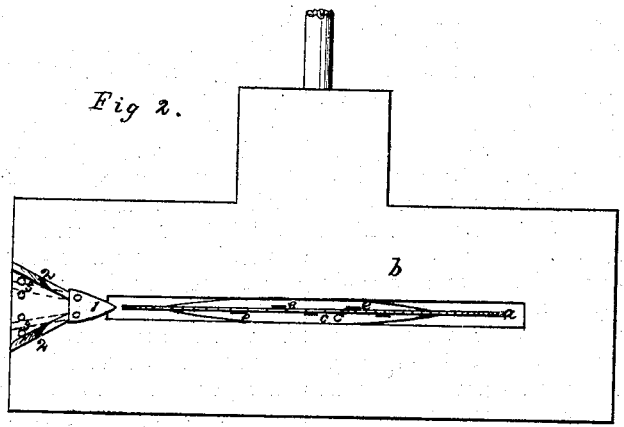
Figure 3:
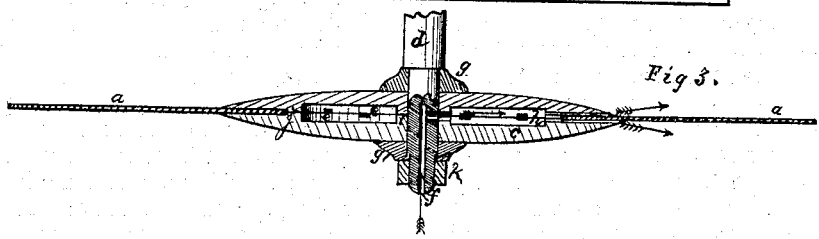
Figure 4:
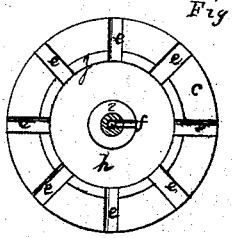

Figure 1 is a side elevation of that part of the machine that the lumber passes over while being cut, showing, also, the saw with its flanges and collars. Fig. 2 is a plan view of the same. Fig. 3 is a transverse section, showing the saw and the manner of attaching the same to the flanges, collars, and shaft. Fig. 4 is a detached view of the inside of the flange.

$b$ is a suitable frame, upon which the saw $a$, Fig. 1, is mounted. The lumber to be sawed is fed in to the saw by any suitable arrangement of feed-rolls common to all machines of this class. The flanges $c$, Fig. 1, are secured to the saw by screws or rivets passing through both flanges and through the saw, thus firmly securing them together and to the saw. The saw and flanges are secured to the shaft $d$, Fig. 3, by the collars $g$ $g'$, Fig. 3, and nut $k$, Fig. 3. The flanges $c$, Fig. 3, are turned down on the face to $j$, Fig. 3, where a shoulder or suitable projection is left to center and steady the saw. Below this shoulder an open space, $h$, Fig. 3, is left between the shoulder $j$ and hub $i$, Fig. 4. The flanges come together at the hub $i$, Fig. 4, to prevent springing when the nut $k$, Fig. 3, is screwed up against it. An opening is left in the hub $i$, Fig. 4, at $f$, which communicates with a corresponding one in the shaft $d$, Fig. 3, at $f$, and communicating with the open space $h$, Figs. 3 and 4, from space $h$, and running through the shoulder $j$, Figs. 3 and 4, to the extreme outer edge of flange $c$, as indicated by arrows, Fig. 3, and shown at $e$ $e$ $e$, &c., Fig. 4. This allows a free circulation of air through the flanges $c$ when the same are in motion. Motion is communicated to shaft $d$ by a suitable pulley attached to the same, and the saw is thus put in motion. As soon as a high rate of speed is attained the air is drawn in at the center of shaft $d$, Fig. 3, and passes into the space or chamber $h$, Fig. 3, and is forced out through the openings $e$ $e$ $e$, Fig. 4. This current of air passing out at $e$ $e$ $e$, between the flanges and face of the saw, prevents the heat that may be generated by the friction of the board against the sides of the flanges that run above the table from being communicated to the saw; and while the flanges may become quite hot the saw will not be affected in the least, and by extending the flanges further out a much thinner saw can be run than by any other means yet discovered, thus saving lumber and power. The center of the saw is merely cut out to give more space and to allow me to make the flanges the thickness of the saw-plate narrower, as it is important to make the flanges between the collars $g$ $g'$, Fig. 3, as thin as possible, and on small saws the only space required at $h$, Fig. 3, is the thickness of the saw-plate. To prevent unnecessary friction and consequent loss of power after the lumber has passed beyond the diameter of the saw I place immediately behind the saw a wedge-shaped piece, 1, Figs. 1 and 2. To open the board so as to relieve the pressure against the flanges after the board has passed the saw, and as different thickness of board require more or less spread to relieve the flanges, (thin stuff requiring more spread than thick,) I attach to the wedge 1, Fig. 1, two adjusting-plates, 2 2, Fig. 2, which turn upon suitable centers, and may be secured and adjusted by pins, as shown in Fig. 2, 3 3, or by screws arranged for the same purpose. This I call an adjustable spreader, and it is regulated according to the thickness of the lumber that is being sawed, so that the flanges may run free in the lumber without unnecessary friction and with less power.

Having described my invention, what I claim, and desire to secure by Letters Patent, is—

1. A single saw with the flanges and collars, when constructed and operated substantially in the manner as shown and described, and for the purpose herein set forth.

2. In combination with the saw and flanges the adjustable spreader, when so constructed and arranged that its width can be varied, substantially in the manner as shown and described, and for the purpose herein set forth.

CHARLES R. TOMPKINS.

Witnesses:
F. H. CLEMENT,
THOS. SMITH.